Patented May 19, 1931

1,806,414

UNITED STATES PATENT OFFICE

JAMES CLARENCE PATTEN, OF INDIANAPOLIS, INDIANA, ASSIGNOR TO METALS PROTECTION CORPORATION, OF INDIANAPOLIS, INDIANA, A CORPORATION OF INDIANA

PROCESSES OF POLISHING CHROMIUM

No Drawing. Application filed September 9, 1926. Serial No. 134,580.

This invention relates to processes of polishing chromium; and it comprises a buffing composition fine grained, calcined bauxite or calcined hydrated alumina and a greasy binder in less amount, such binder having the hardness and general properties of stearic acid or of stearic acid hardened with beeswax; and it also comprises a method of polishing surfaces of chromium and chrome platings which comprises abrading such surfaces with calcined alumina; all as more fully hereinafter set forth and as claimed.

Electroplatings of the various metals are customarily submitted to a treatment known as color buffing, for the purpose of brightening the surfaces. None of the metals ordinarily electro-deposited is very hard, nickel being about the hardest, and they offer no particular difficulty in buffing with the ordinary buffing wheels and the ordinary compositions. Copper, silver, gold, nickel and the like, being ductile and not very hard, tend to flow under pressure and burnishing and give bright surfaces with the ordinary substances used in buffing compositions, such as quicklime, infusorial earth (kieselguhr), fine sand, and the like. The polishing materials are used in various finenesses, but ordinarily between 150 and 200 mesh fineness. The abrasives are held by a binder of hard grease or wax, such as stearic acid, beeswax, tallow, and the like.

Recently, however, electrocoatings of chromium have appeared and these are difficult to handle in color buffing. The metal is very hard and polished in the ordinary ways exhibits no tendency to flow. Treating it under the wheel is more like a polishing operation on a solid metal surface than a buffing operation, as buffing is ordinarily understood. None of the buffing compositions in use with other metals have much value in this relation. Polishing materials must be chosen with a view to getting an effect which is intermediate between a cutting action and a true buffing action. Electrodeposited coats of chromium are often dull gray and apparently "burnt" and special materials are necessary to get proper surfaces. When very hard abrasives such as carborundum, alundum and emery are used, while the coatings withstand their action to a great extent, cutting and scratching are apt to occur to an undesirable extent. Chromium coatings are hard, being often hard enough to scratch glass and are moreover usually quite thin; and in polishing with very hard abrasives there is risk of injury to the film while good luster is difficult to obtain. One of the valuable properties of chromium coatings is the protection afforded to underlying corrodible metals and it is extremely undesirable to rupture or fissure the hard coating at any point.

In the present invention, a particular material is used, requiring a little longer time than the hard abrasives in polishing chromium, but giving a better surface and without risk of damage by cutting through the deposited chromium coat in thin places.

I have found that for this purpose and to produce the desired results it is advantageous to use a buffing composition carrying as its main abrasive component a preparation obtained by calcining hydrated alumina. An ordinary, internally fired rotating drum may be used. In it the alumina is dehydrated, shrunk and hardened, acquiring the degree of hardness desirable for my purposes. This degree of hardness is substantially less than that of alumina or bauxite fused or shrunk in the electric furnace. Precipitated, hydrated alumina obtained in any usual way may be used, or I may use native hydrated forms of alumina, such as bauxite. The best form of alumina I have used is the preparation obtained from bauxite by dissolving the alumina in caustic soda solution and reprecipitating. The hydrated alumina is calcined at a temperature sufficient to dehydrate, partially shrink and partially harden the same but at a temperature substantially below the point of fusion where complete shrinkage and full hardening occur. The product is calcined alumina and by this term I mean a dehydrated, shrunk and hardened alumina having a hardness materially less than that of emery or fused alumina (alundum). A large portion of the unexpected advantageous results obtained in polishing chromium with this calcined alumina, I believe may be attributed to this degree of hardness.

This calcined alumina is the basis of my new composition for polishing chromium. While minor amounts of other polishing materials may be used in admixture with the same, calcined alumina should be the main component. While I sometimes use admixtures of harder materials, such as emery, carborundum, or alundum (alumina fused or shrunk in the electric furnace), I use them in minor amount only. In practice, I often employ a small percentage of floated flour emery, chromium sesquioxid or silica sand. All the abrasives in the composition are advantageously of great fineness. A fineness such that 80 to 90 per cent will pass through a 250 mesh sieve is advantageous. While the abrasive made under the present invention may be used alone, that is, as fine powder, in polishing chromium, it is generally advantageous to use it with a hard greasy binder of the nature of the binders used in buffing compositions, such as stearic acid or a mixture of stearic acid and beeswax. In making up compositions with these binders, the latter are first melted and the dry abrasive added and thoroughly admixed. This is conveniently done in a mold, so as to produce a cake on cooling. Sometimes, for convenience in incorporation, it is desirable to grease the fine powder preliminarily with a little vaseline or the like before adding it to the molten mass in the molds. As calcined alumina is not sensitive to the action of the air in any way, no particular precautions are necessary in making or using the mixture.

In a typical embodiment of the present invention, I may use for each pound of calcined bauxite or alumina about 0.5 pound stearic acid. Where vaseline or petrolatum is used for greasing the powder, about 0.5 ounce will suffice for 1 pound bauxite. Instead of using 0.5 pound of stearic acid, there may be used the same amount of a 3 to 1 mixture of stearic acid and beeswax. Where other abrasives are used in connection with the calcined bauxite, their amount, as stated, should be comparatively small. There may be used, for example, an ounce or so of chromium sesquioxid or of sand with a pound of bauxite.

The compositions just described employ a hard binder and for convenience may be made in the form of molded cakes, the hot molten wax and the abrasive being mixed in a suitable mold and allowed to solidify. For many purposes, a softer and more temporary binder is desirable, so that I sometimes use a sort of jellied soap or other soft binder. A suitable jellied soap may be made by taking equal weights of soap and hot water. The amount of calcined bauxite added may be about 50 per cent of the jelly, by weight. Where these soft compositions, which have about the consistency of various commercial greases, are used, they may be applied to the wheel with a brush. They are desirable where particularly high finishes are wanted, as in making reflectors.

What I claim is:—

1. The process of producing lustre on surfaces of chromium which comprises polishing such surfaces with a fine grained product comprising calcined hydrated alumina, the said product having a hardness materially less than that of emery.

2. The process of producing lustre on surfaces of chromium which comprises polishing such surfaces with a fine grained product comprising calcined bauxite, the said product having a hardness materially less than that of emery.

In testimony whereof, I have hereunto affixed my signature.

JAMES CLARENCE PATTEN.